United States Patent [19]
Mears et al.

[11] Patent Number: 6,141,361
[45] Date of Patent: Oct. 31, 2000

[54] WAVELENGTH SELECTIVE FILTER

[75] Inventors: Robert Joseph Mears, Cambridge; Stephen Thomas Warr, Suffolk; Michael Charles Parker, Surrey, all of United Kingdom

[73] Assignee: British Technology Group Limited, London, United Kingdom

[21] Appl. No.: 08/817,876

[22] PCT Filed: Sep. 29, 1995

[86] PCT No.: PCT/GB95/02326

§ 371 Date: Jul. 24, 1997

§ 102(e) Date: Jul. 24, 1997

[87] PCT Pub. No.: WO96/10762

PCT Pub. Date: Apr. 11, 1996

[30] Foreign Application Priority Data

Sep. 30, 1994 [GB] United Kingdom .................... 9419757

[51] Int. Cl.[7] .............................. H01S 3/107; G02B 5/20
[52] U.S. Cl. ........................... 372/20; 359/237; 359/246; 359/259; 372/94; 372/98
[58] Field of Search ................................. 372/20, 26, 6, 372/94, 98, 102; 359/237, 246, 250, 259

[56] References Cited

U.S. PATENT DOCUMENTS

| | | | |
|---|---|---|---|
| 4,371,263 | 2/1983 | Witte ........................................ | 356/333 |
| 5,132,976 | 7/1992 | Chung et al. .............................. | 372/20 |
| 5,222,071 | 6/1993 | Pezeshki et al. ........................... | 372/20 |
| 5,949,804 | 9/1999 | Okazaki .................................... | 372/20 |

FOREIGN PATENT DOCUMENTS

| | | |
|---|---|---|
| 0 405 974 A2 | 1/1991 | European Pat. Off. . |
| 2 216 678 | 10/1989 | United Kingdom . |

OTHER PUBLICATIONS

N. Collings, et al., "Evolutionary Developement of Advanced Liquid Crystal Spatial Light Modulators," Applied Optics, Nov. 15, 1989, vol. 28, No. 22, pp. 4740–4747.

S. Warr et al., "Optically Transparent Digitally Tunable Wavelength Filter," Electronics Letters, Jan. 19, 1995, vol. 31, No. 2, pp. 129–130.

Dames et al., "Effecient Optical Elements to Generate Intensity Weighted Spot Arrays: Design and Fabrication," Applied Optics, Jul. 1, 1991, vol. 30, No. 19, pp. 2685–2691.

Barnes et al. "Phase–only Modulation Using a Twisted Nematic Liquid Crystal Television," Applied Optics, Nov. 15, 1989, vol. 28, No. 22, pp. 4845–4852.

International Search Report dated Jan. 12, 1996.

Primary Examiner—James W. Davie
Attorney, Agent, or Firm—Sughrue, Mion, Zinn, Macpeak & Seas, PLLC

[57] ABSTRACT

A tunable optical wavelength selective filter is constituted by a dynamic holographic diffraction element (3) in combination with a fixed diffraction grating or hologram (2). The dynamic diffraction element (3) is preferably implemented as an electronically controlled image displayed on a pixelated spatial light modulator and in particular a spatial light modulating using photo-electronic integrated circuits fabricated using silicon VLSI technology and integrated with ferro-electric liquid crystals. Amongst other uses the filter can be implemented to form a digitally tunable laser.

18 Claims, 5 Drawing Sheets

WAVELENGTH SELECTIVE FILTER

TECHNICAL FIELD

The present invention relates to a wavelength selective filter and a tunable laser including it.

BACKGROUND ART

Many different types of optical filters for selecting light of a particular wavelength have been proposed in conjunction with wavelength division multiplexed optical systems for use in optical communication systems.

Also the use of a single fixed diffraction grating for passive optical wavelength separation is well understood. The spectral components of the input source are separated and distributed around an output plane so that selection of the correct spatial region allows any spectral component to be isolated. Thus, spatial filtering of the output plane produces spectral filtering of the source. Such a technique can be used to demultiplex a wavelength division multiplexed signal consisting of a number of data-modulated wavelength channels provided that the size of the output devices are correctly matched to the data bandwidths.

A single fixed diffraction grating only separates the different wavelength channels and allows no recombination of these channels in the output plane. Re-selection of the output wavelengths i.e. somehow tuning such a filter can only be achieved by changing the grating, rotating it or somehow moving the spatial filtering device in the output plane. In the past these have been implemented by some form of servomechanical system with a feedback control to cause physical movement of the grating or of a photodetector or optical fibre receiving light in the output plane.

An example of an optical crossbar switch using a variable hologram to route light in a particular direction between its input and output and so, in effect, cause switching between a particular input of the crossbar switch and a particular output is described in an article entitled "A Holographicly Routed Optical Crossbar: Theory and Simulation" by D. C. O'Brien, W. A. Crossland and R. J. Mears published in Optical Computing and Processing, 1991, volume 1, number 3, pages 233–243.

DISCLOSURE OF INVENTION

According to a first aspect of this invention a tunable optical wavelength selective filter comprises a dynamic holographic diffraction element in combination with a fixed diffraction grating or hologram.

Such a filter can be used in coherent and semi-coherent spread-spectra applications and is likely to be used principally within the visible and infra-red frequency band.

The filter in accordance with this invention relies upon the fixed diffraction grating or hologram to disperse light of different wavelength into its constituent spectral components or, for example, wavelength-multiplexed data streams, and then using the additional dynamic holographic diffraction pattern for tuning the filter so that by altering the holographic diffraction pattern present on the dynamic hologram it is possible to alter the wavelength or wavelengths which leave the particular angle of interest. The combination of a dynamic holographic diffraction element and a fixed holographic element may also be arranged arbitrarily to recombine various of the wavelengths in the output plane.

The dynamic diffraction element preferably is some type of opto-electronic interface which can take a number of forms depending upon the actual application. The dynamic diffraction element is preferably implemented as an electronically controlled image displayed on a pixellated spatial light modulator and in particular a spatial light modulator using opto-electronic integrated circuits fabricated using silicon VLSI technology and integrated with ferro-electric, nematic or electroclinic liquid crystals. Such spatial light modulators are well suited to telecommunication applications in terms of speed, reliability and ease of interfacing to control electronics. Such devices are readily controllable, typically via a computer to display one of a series of different holographic diffraction patterns. Typically such holograms are 2-dimensional optical phase and/or amplitude gratings which produce a controllable deviation and dispersion of the incident light but which can also be arranged to control optical fan-out and fan-in operations, to generate multiple output beams by splitting the input beams into two or more such output beams, and to deflect the input beams in two dimensions rather than one.

The fixed grating may simply have the form of a fixed regular amplitude grating or phase plate. When the fixed grating has the form of a phase plate it may be an etched glass plate and may be physically combined with the dynamic holographic diffraction element by, for example, being etched into its outer surface. The fixed hologram may be computer generated.

For both holographic components phase-mode operation rather than amplitude-mode operation provides greater diffraction efficiency and therefore lowers signal loss through the filter. In addition, multi-level or blazed holograms or gratings can be used to maximise the efficiency by preferentially diffracting the light into the desired angular orders.

Preferably, the filter further comprises one or more multi-wavelength input sources and one or more output channels. The input source may take the form of an active multi-wavelength laser or semi-coherent device which is possibly spatially filtered or be the end of a cleaved fibre or waveguide. Multiple inputs can be accommodated either by using a single collimating lens so that the spatial positioning of the inputs is converted into an initial angular multiplexing through the system which is super-imposed on the output positions, or by separately collimating each of the sources using a multi-way lens array and then dividing the holograms into multiple sub-holograms so that each one is uniquely illuminated by a different input source. In addition a combination of both methods could be used. The filter preferably includes an output lens to convert the output angular direction of the light beams into a more useful spatial separation by wavelength.

The two holograms or gratings may be either transmissive or reflective. In the latter case beam splitters could be used, or the holograms could be tilted to separate the incident and diffractive paths. A reflective architecture allows the possibility of compacting the system by folding its optical axis back on itself so that the input and outputs then lie in the same plane, and so that a single lens can be used for both the input and output. The output channels can be detected using light sensitive photodiodes, a charge coupled device array or can be launched directly into a single array of output waveguides or fibres. When the spectral components are spatially distributed in the output plane the physical size of the output channels determines the bandwidth or spectral range collected by each output.

The filter in accordance with the invention is optically transparent, that is, filter tuning is achieved without the need to convert the optical input signal into an electrical signal and then back again to an optical signal once again. Once the filter has been tuned, the input data rate of such a filter is only limited by the source modulation rates and not by any part of the filter.

According to a second aspect of this invention, a tunable laser includes a filter in accordance with the first aspect of this invention within its optical cavity.

Such a tunable laser is thus electronically digitally tunable without moving parts and with the geometry of the configuration permitting a high degree of wavelength stability and repeatability. Such a laser may be used in test equipment for fields such as communication where calibration and stability are key features and may be used as a source of light in wavelength division multiplexed applications on communication networks or spectroscopy.

BRIEF DESCRIPTION OF DRAWINGS

Examples of the present invention will now be described with reference to the accompanying drawings in which.

DETAILED DESCRIPTION

Figure 1:
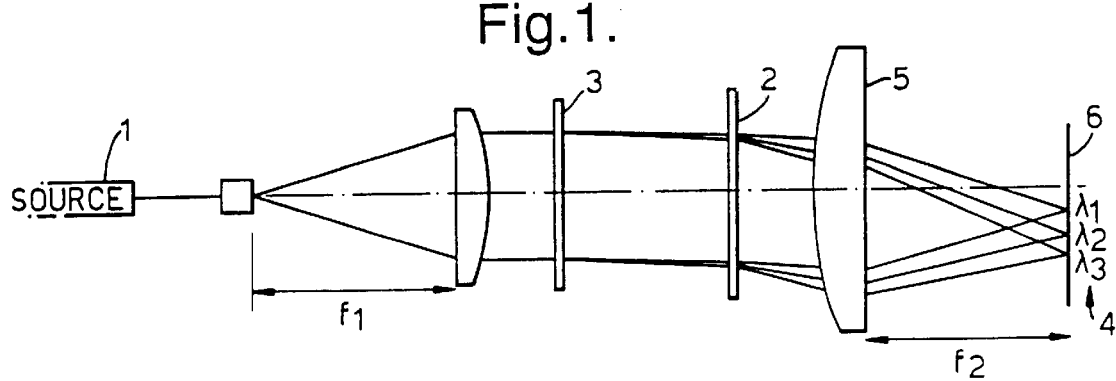
FIG. 1 is an optical diagram of a tunable filter.

This section describes the design of a wavelength selective filter comprising of:

one or more multi-wavelength input sources 1;

a fixed grating or hologram 2;

a dynamic grating or hologram 3; and one or more output channels 4.

The principle of operation of the wavelength filter is the angular separation and selection of wavelengths using a coarse dynamic hologram 3 to tune onto a highly wavelength dispersive, fixed hologram 2 (although the sequence of the dynamic hologram 3 and fixed hologram 2 may be reversed). If all the spectral components of the illumination source 1 are parallel and collimated when they enter the filter, each component will leave the two hologram combination in a dynamically controllable direction. By altering the dynamic hologram pattern, it is possible to alter which wavelengths $\lambda_1, \lambda_2, \lambda_3 \ldots \lambda_n$ leave at the particular angular directions of interest. The output angular dispersion of these collimated beams can then be converted into a more useful spatial wavelength-separation by means of a lens 5, FIG. 1. Arbitrary spatial filtering of the output plane 6 therefore selects arbitrary wavelength components from the input source. These wavelengths have been tuned to their current output plane positions by the dynamic hologram 3.

Figure 2A:
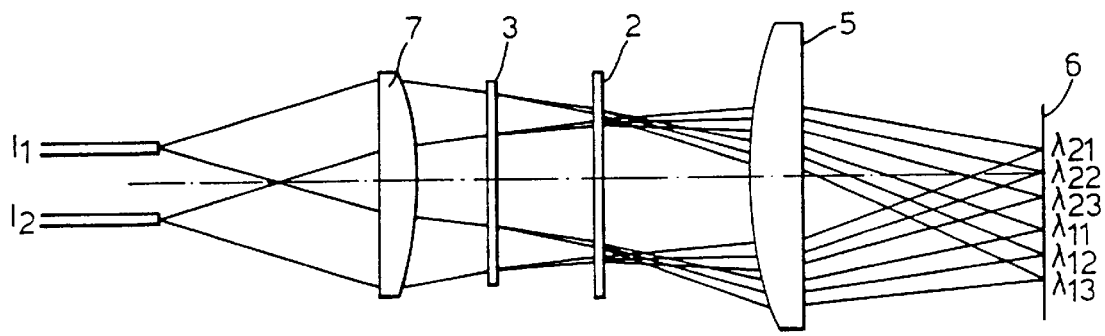
FIGS. 2a and 2b are optical diagrams showing optical filters with two different input schemes.
Figure 2B:
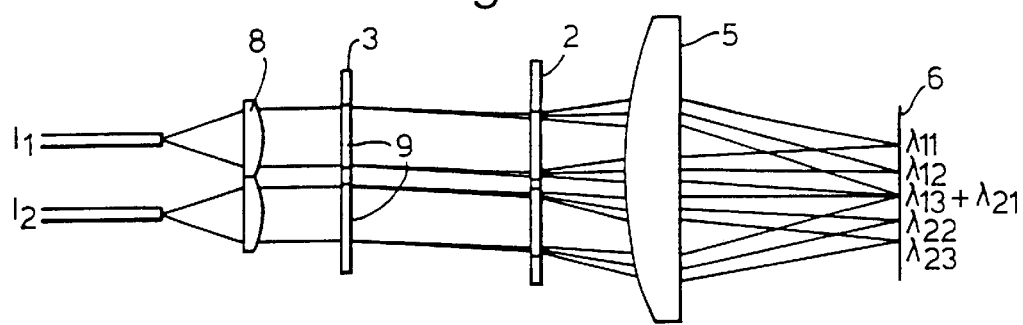

The input source 1 could take the form of an active multi-wavelength laser or semi-coherent device (possibly spatially filtered), or of a cleaved fibre or waveguide. Multiple inputs can be accommodated either using a single collimating lens 7 so that the spatial positioning of the inputs is converted into an initial angular multiplexing through the system which is superimposed on the output positions, or by separately collimating each of the N sources using an N-way lens array 8 and then dividing the holograms into N (different) sub-holograms 9 so that each one is uniquely illuminated by a different input source, FIGS. 2a and 2b. In addition, a combination of both methods could be used.

The dynamic hologram 3 would probably be implemented as an electronically controlled image displayed on an amplitude- or phase-mode SLM; the fixed hologram 2 simply consists of an amplitude- or phase-plate (e.g., etched glass). For both components, phase-mode operation, rather than amplitude-mode, will provide greater diffraction efficiency and therefore lower signal loss through the filter. In addition, multi-level or blazed holograms can be used to maximise the efficiency by only diffracting the light only into the desired angular orders.

For some embodiments, one or both holograms may deflect the input beams in 2-dimensions, rather than the 1-dimensional diagrammatic form shown in FIG. 1. They may also be used to generate multiple output beam deflections, i.e., the input beams are split, so that each wavelength component appears in the output plane more than once per input. Hence arbitrary space and/or wavelength switching between multiple inputs and multiple outputs may occur using an optical fan-out and fan-in principle.

The two holograms may be either transmissive or reflective or a combination of the two. In the reflective case, beam splitters could be used, or the holograms could be tilted to separate the incident and diffracted paths. A reflective architecture additionally allows the possibility of compacting the system by folding the optic axis back upon itself, thus combining $f_1$ and $f_2$ into a single lens. The inputs and outputs would then lie in the same plane.

The output channels could be detected using light-sensitive photodiodes, a charge-coupled device array (CCD) or could be launched directly into an output waveguide, waveguide array, fibre or fibre array. Because the spectral components are spatially distributed in the output plane, the mode size of the output channels determines the bandwidth (i.e., spectral range) collected by each output. If the holograms are reduced to regular gratings then from diffraction theory, the wavelength arriving at a particular point in the output plane is approximately predicted by equation (1) below. If either (or both) holograms split the incident light beam in more than one direction, this equation may be solved using the set of equivalent regular grating pitches.

$$\lambda = \frac{y - x}{f \left\{ \frac{1}{d_F} + \frac{n}{N} \times \frac{1}{d_{SLM}} \right\}} \qquad (1)$$

where $\lambda$ is the wavelength selected by the filter, x is the input device's displacement from the system's optic axis, y is the output device's displacement from the system's optic axis, $d_F$ is the fixed holographic pitch, $d_{SLM}$ is the dynamic holographic pitch, (pitch of one pixel)

n is an integer in the range $-N/2 \rightarrow +N/2$ representing the tuning of the filter, N is the SLM dimension in number of pixels.

The dynamic hologram 3 modifies the light's incident angles onto the fixed hologram 2 in fine angular steps, hence tuning the switch. The greater the ratio between the fixed and dynamic holographic pitches, the finer the wavelength tuning step produced.

Control of the filter and hence selection of the filtered spectral components arriving at the output 4, simply relies on the generation and display of the correct holographic images on the SLM. The set of possible holograms can be pre-generated and stored in electronic non-volatile memory behind the filter and then transferred to the SLM when required.

The number of images required, and hence the total tuning range of the filter, depends on the number of SLM pixels that are used. Provided $d_F \ll d_{SLM}$, the filter will exhibit an almost constant wavelength tuning step over much of the filter range.

An important feature of the proposed design is that in a fibre input/fibre output environment, it is optically transparent. Once the filter has been tuned, the input data rate is essentially limited only by the source modulation rates and the filter bandwidth.

Figure 3:
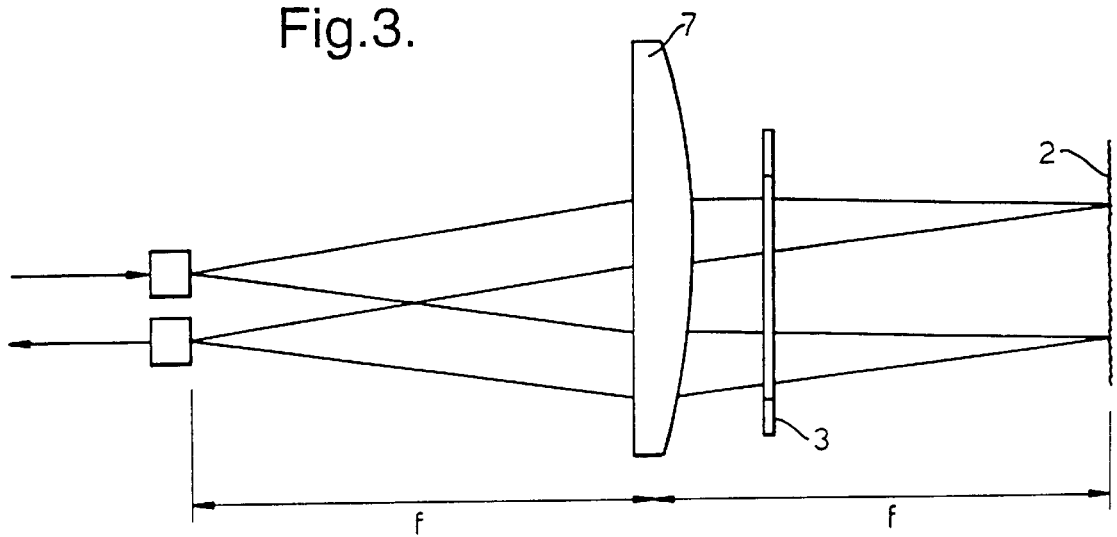
FIG. 3 is an optical diagram of an example of a tunable filter with a folded optical axis.

The optical tunable wavelength filter principle has now been described and an actual embodiment is shown schematically for a single input/single output filter as FIG. 3.

In the scheme shown, the optic axis has been folded back upon itself by utilising a reflective phase grating as the fixed hologram 2 and using a transmissive SLM as the dynamic hologram 3. This system has been experimentally demonstrated. The fixed hologram used was simply a regular 1-dimensional aluminium coated grating with 50 line pairs/mm. The cross-section of this grating is a square wave with an etch depth of $\lambda/4 \approx 370$ nm to give $\pi$ phase operation at commercial fibre optic wavelengths around 1.5 $\mu$m.

The SLM has a pixel pitch of 180 $\mu$m and has been optimised for use at similar infra-red wavelengths. It is to be used to tune the filter by displaying a pre-generated series of non-regular 1-dimensional holograms, orientated in the same direction as the fixed grating lines.

The input and output channels are both single-mode fibre with core diameters of about 10 $\mu$m.

In one architecture the optical beam may be passed through the dynamic hologram, onto the fixed grating, and then back through the same, (or an identical) dynamic hologram. The overall result is that the two passes of the dynamic hologram exactly cancel one another out, thus removing any angular variation of approach to the output, but retaining the tuning ability of the filter. Provided the fixed hologram is placed exactly a focal distance, f, from the lens so that the system becomes a 2f architecture, there will always be a single, unique path from the input to the output and the particular wavelength (or multiple wavelengths) that follow this path are determined by the dynamic holographic image being displayed on the SLM. In addition, this characteristic is independent of the exact position of the SLM. The alignment conditions of the architecture are therefore no worse than for a non-tunable WDM multiplexer.

A property of the type of the ferro-electric SLM used here is that it is only capable of displaying binary holograms, i.e., each pixel has only two states of transmittance of either +1 or $e^{j\theta}$ when it is operating in a phase-mode, or 0 and +1 in amplitude-mode. Binary holograms always contain rotational symmetry in their output fields. Thus for every computed diffraction order, there exists a symmetric order of equal intensity. The symmetric order modifies equation (1) and introduces extra solutions:

$$\lambda = \frac{y - x}{f \left\{ \frac{1}{d_F} \pm \frac{n}{N} \times \frac{1}{d_{SLM}} \pm \frac{n}{N} \times \frac{1}{d_{SLM}} \right\}} \quad (2)$$

where n is now an integer $$\text{the range } 0 \to +\frac{N}{2}, \lambda_{CENTRE} = \frac{y - x}{f \times \frac{1}{d_F}}$$

It can be seen from (2) that $\lambda_{CENTRE}$ is always a solution of the filter (regardless of the dynamic tuning), but that the output spectrum will also contain one tuned spectral component at a higher wavelength and another at a lower wavelength than this fixed component. By designing the filter such that this centre wavelength and one of the sidebands lie in non-active regions of the input spectrum, a generalised non-symmetric tunable filter for single-mode fibre applications can still be achieved using binary dynamic holograms.

If a different SLM capable of multi-level holograms were used instead, the above problem (caused by the double pass of the SLM) will not arise unless we attempt to fan-out the incident beam into several diffraction orders.

Figure 4:
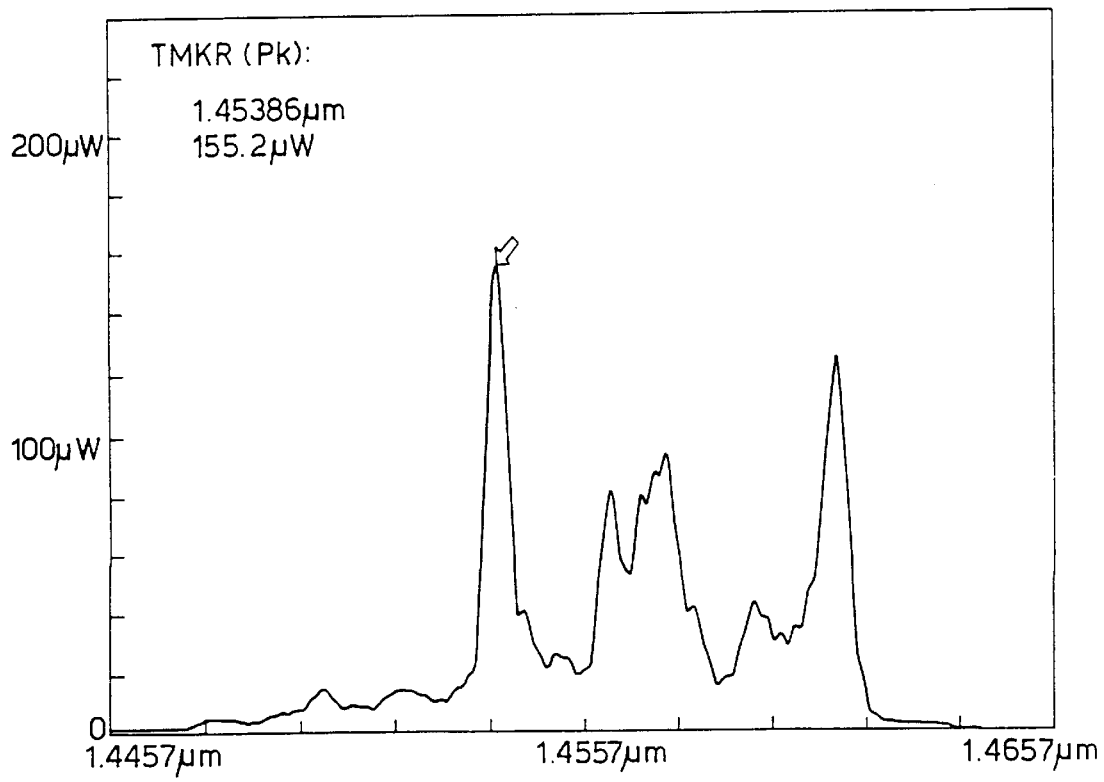
FIGS. 4 and 5 are graphs showing the performance of the example of FIG. 3.
Figure 5:
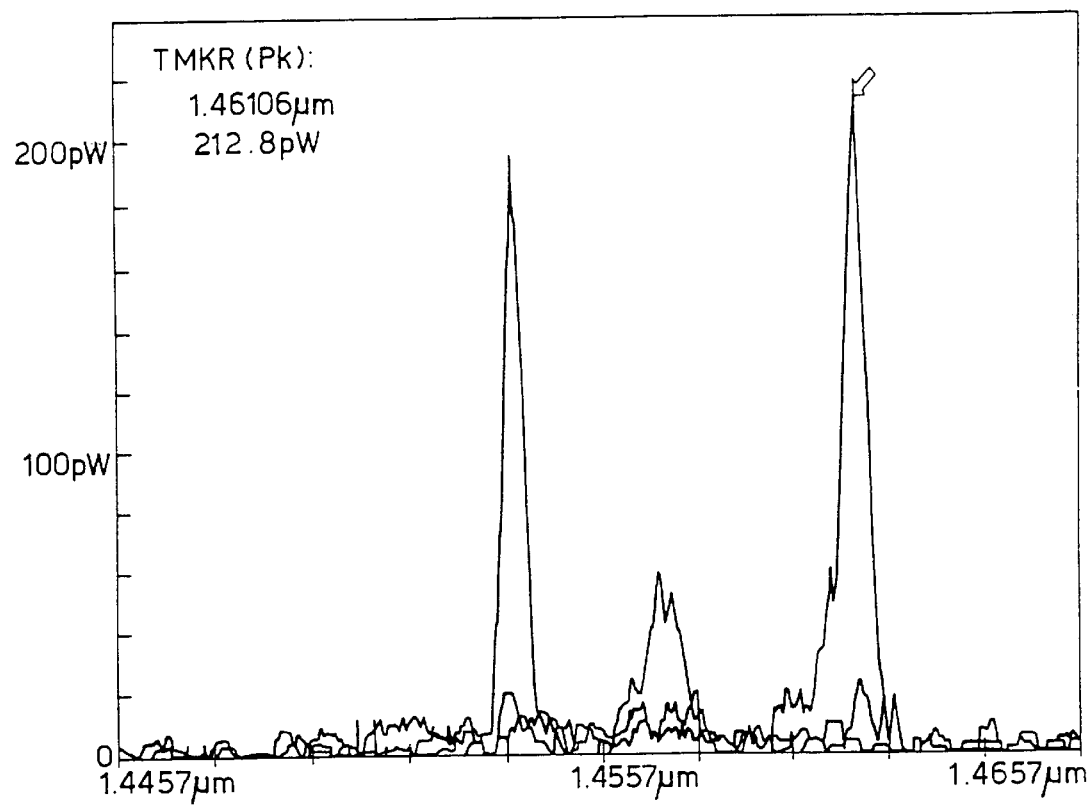

A complete experimental investigation of this particular embodiment has been performed using binary holograms, to verify its correct operation. The single-mode fibre-tailed input source used during the experiment had the spectrum shown in FIG. 4. The filter was arranged such that the upper sideband and centre filter solutions lie to the right of this spectrum (i.e., at a higher wavelength). The lower sideband solution was then tuned by displaying various holograms on the SLM to isolate the three major modes of the input spectrum. This is shown as the three plots of FIG. 5. These plots are the measured spectra launched into the single-mode output fibre.

The high loss of the current experimental filter is mainly due to the very poor performance of the SLM that was used and the need to place this device between crossed polarisers. The majority of the remaining loss could be eliminated by using a blazed or multi-level grating as the fixed hologram.

A tunable filter allows additional switching functionality to be incorporated into the demultiplexer design. A tunable filter of the type proposed has a wide range of applications including:

i) Analysis, filtering and/or shaping of coherent spread-spectra sources, including applications involving time-dependent measurements.

ii) The generation of a tunable laser source by placement of the filter in the resonant cavity of a laser.

iii) The implementation of a tunable single or multiple wavelength coherent source(s) using a broadband coherent source as input.

iv) The implementation of a tunable wavelength switch or receiver(s) for selection of one or more wavelengths through one or more output channels, using a multi-wavelength input source or sources.

Applications (iii) and (iv) are important components in the implementation of multi-wavelength communication networks, especially in WDM environments, including high-density systems (HDWDM). Special consideration is made in this design of the need to couple light back into single-moded optical-fibre for these applications.

The proposed design implements a tunable non-mechanical (de)multiplexer or tunable cavity laser by placement of a combination of a fixed (holographic) grating and a dynamic holographic grating in the path of a collimated light beam.

The fixed grating achieves a high degree of wavelength separation, providing good linearity over the tuning range within a compact size.

The dynamic hologram provides a means of tuning the filter in potentially very fine wavelength increments.

The size of the system could be reduced further by etching the fixed grating or hologram directly onto a glass face of the SLM dynamic hologram device.

Alignment conditions of the design are no worse than those of a fixed WDM (de)multiplexer because the design functionality is independent of the exact positioning of the dynamic hologram between any initial collimating lens and the fixed hologram.

The filter is optically transparent. That is, filter tuning is achieved without the need to convert the optical input signal into an electrical signal and back to an optical one again.

Figure 6:
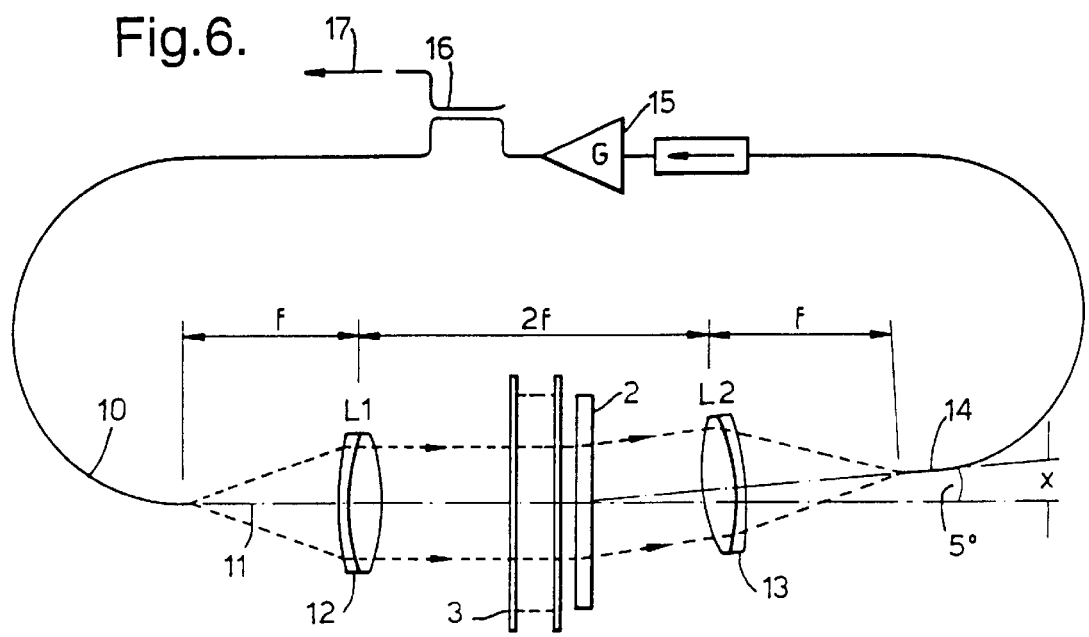
FIG. 6 is an example of a uni-directional tunable fibre ring laser.

The construction of a tunable fibre ring laser using the wavelength selective filter of the present invention, is shown in FIG. 6. Light from an input single-moded communications fibre 10 ($\phi_c \approx 10$ $\mu$m) aligned along the optical axis 11 is collimated by a doublet lens 12 optimised for use in the near infra-red and of focal length f=96.1 mm. The beam is passed through the SLM 3 and diffracted by the displayed binary phase hologram, which is effectively a one dimensional grating. The diffracted orders are then further diffracted and angularly dispersed by a fixed binary phase grating 2, which has been optimised to give a $\pi$ phase change at a wavelength of 1550 nm. The light then passes through a similar doublet lens 13 which spatially separates the angularly separated diffracted orders. The second lens 13 is also placed at an angle of 5° to the optical axis 11, so as to omptimise the coupling efficiency of the output fibre 14 placed a distance x=8.5 mm from the optical axis 11 in the focal plane of the second lens 13 and on the optical axis of lens 13, which collects light from only one diffracted order. Thus for a particular hologram displayed on the SLM 3, only one wavelength will be coupled back into the second fibre 14. Tuning of the filter is performed simply by changing the spatial frequency of the hologram displayed on the SLM.

The SLM 3 is a transmissive multiplexed glass cell with 128×128 pixels on a 165 $\mu$m pitch that has been optimised to act as a half wave plate around the 1.5 $\mu$m erbium window and can be reconfigured in under 5 ms. The fixed transmission grating 2 is made with a spatial period of 18 $\mu$m and is fabricated by spinning a layer of photoresist on a glass flat to a depth of $$\frac{\lambda}{2(n_1 - n_0)} \approx 1295 \text{ nm}$$

(where $n_o$ is the refractive index of air, $n_1$ is that of the photoresist $\approx 1.6$) and using photolithography to selectively etch a binary phase grating.

The holograms are digital binary-phase pixellated images which are generated using an iterative algorithm such as simulated annealing. The holograms may be designed to optimally direct light of a fixed wavelength to a single spot anywhere in the first order, or to fan out the light to multiple spots. This can be extended so that the hologram can optimally direct a single desired wavelength or multiple wavelengths of light to a fixed point in the output plane. The equation governing the wavelength to be coupled back for the filter in FIG. 6 is given approximately by:

$$\lambda \approx \frac{x}{f\left(\frac{n}{ND} + \frac{1}{d}\right)}$$

where $\lambda$ is the wavelength, x=8.5 mm is the distance of the output fibre from the optical axis, f=96.1 mm is the focal length, N=128 is the number of pixels in the SLM, D=165 $\mu$m is the SLM pixel pitch, d=18 $\mu$m is the period of the fixed diffraction grating. The factor n/ND represents the equivalent spatial frequency of the displayed hologram, where n is an integer between 0 and N/2. Binary phase holograms produce symmetric outputs so that half the light is always lost. Coupled with a diffraction efficiency of 81% and the since envelope, each grating contributes a loss of 4.4 dB. The FLC SLM can also only diffract $\sin^2 2\theta$ of the incident light, where $2\theta=28°$ is the switching angle of the FLC, thus causing a loss of 6.6 dB. coupling of only 40% between the two fibres causes a loss of 4.0 dB while reflections cause an additional 1.8 dB loss. With other losses, the total loss through the filter is currently 22.3 dB, but this could be substantially reduced by optimisation of the optical materials and components. The tuning speed of the filter is determined by the frame update rate of the SLM and the inherent redundancy in holograms makes the system extremely robust in the event of individual pixel failures.

Figure 7:
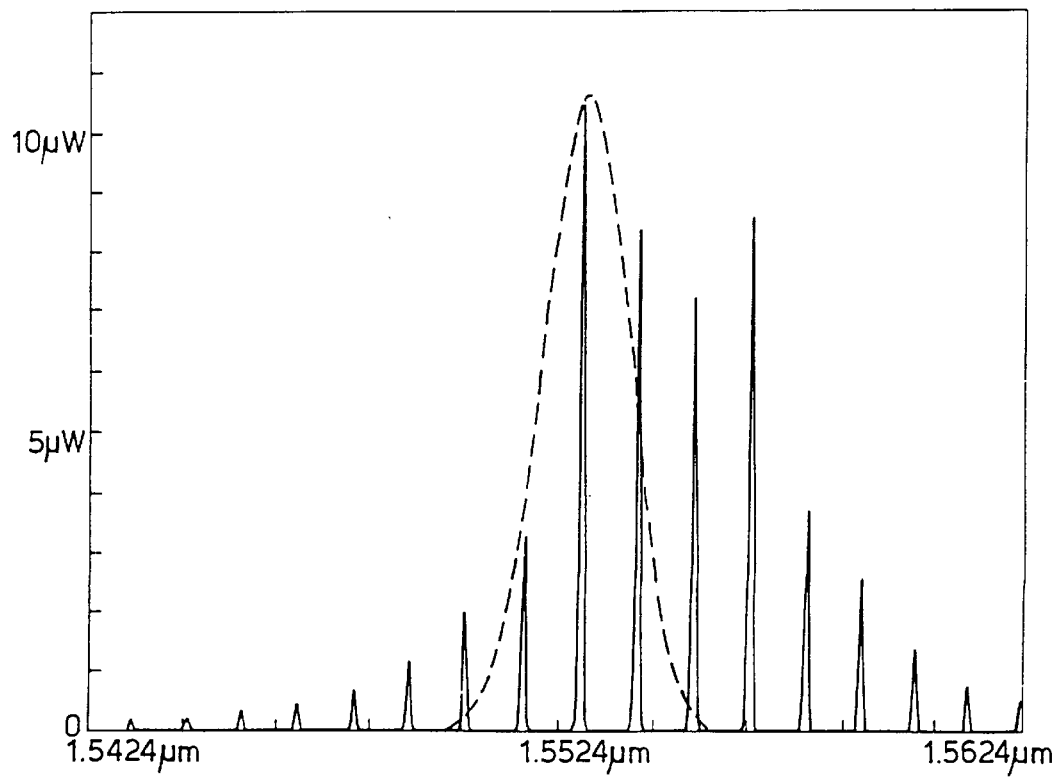
FIG. 7 shows the output of a Fabry-Perot laser diode source.
Figure 8:
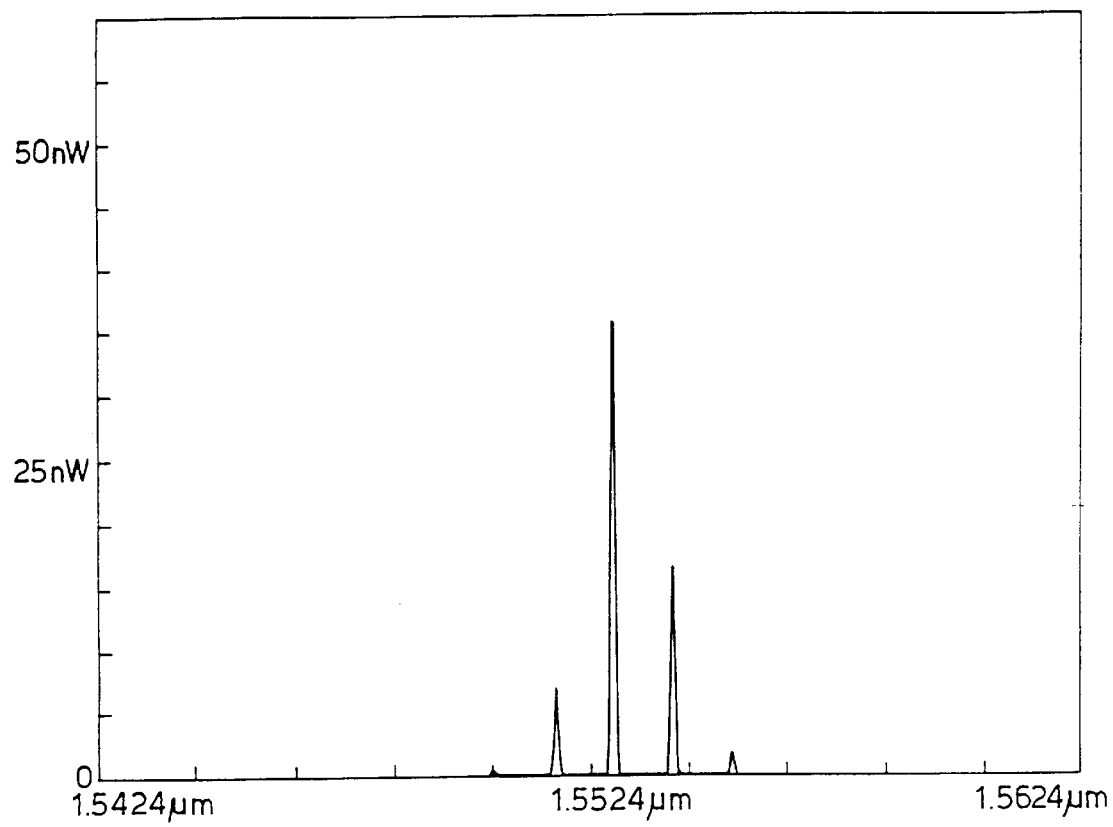
FIG. 8 shows a digitally filtered spectrum of FIG. 7.

The laser source for characterisation of the filter is a Fabry Perot laser diode source with multiple lasing modes, as shown in FIG. 7, spaced 1.2 mm apart. The filter successfully isolates the individual modes. An arbitrary filter result is shown in FIG. 8. In this example, the FWHM of the filter is 2 nm, which is almost diffraction limited, and the filter can be tuned in steps of 1.3 nm over a theoretical range of 82 nm. Finer resolution and a smaller FWHM could be achieved by increasing f or the fixed grating resolution, subject to the available SLM clear aperture.

Placing the filter and an erbium-doped fibre amplifer 15 in a uni-directional fibre ring resonator forms a digitally tunable fibre ring laser. For monitoring a 5:95 coupler 16 placed in the amplifier 15 is used at the laser output 17.

Figure 9:
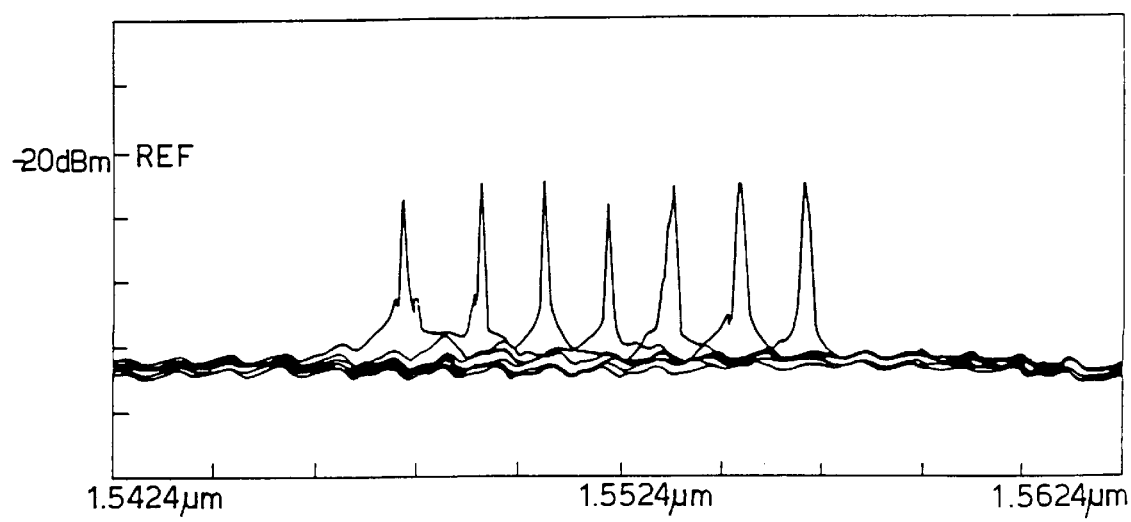
FIG. 9 shows the selection of lasing wavelengths using the tunable fibre ring laser of FIG. 6.

In tests, lasing was achieved over the range 1543 to 1566 nm in discrete steps with an average spacing of 1.3 nm. The measurements were recorded using an optical spectrum analyser. FIG. 9 shows an arbitrary group of seven successively tuned lasing modes. The signal from the 5:95 coupler 16 was attenuated by a further 23 dB to avoid possible damage to the spectrum analyser. Substantial output power could also be accessed by placing a fibre in the zero order of the SLM and collecting the undiffracted light. This would obviate the need for an additional coupler in the fibre loop.

When holograms are designed, there are many possible solutions which tune to ostensibly the same wavelength. But in fact the solutions all have slight variations in their spatial frequencies and output phase profiles. This ultimately causes fine differences in the wavelength which is most efficiently coupled back into the second fibre, and consequently the lasing frequency.

What is claimed is:

1. A tunable filter for polychromatic optical radiation comprising an electronically programmable spatial light modulator for displaying computer generated hologram patterns of data as a series combination of a first dynamically variable wavelength dispersive element, and a second static wavelength dispersive element.

2. A tunable filter according to claim 1, in which the second static wavelength dispersive element (2) comprises a fixed hologram.

3. A tunable filter according to claim 1, in which the second static wavelength dispersive element (2) is a phase plate.

4. A tunable filter according to claim 3, in which the phase plate is physically combined with the first dynamically variable wavelength dispersive element (3).

5. A tunable filter according to claim 1, in which the second static wavelength dispersive element (2) is an amplitude grating.

6. A tunable filter according to claim 1, further comprising one or more multi-wavelength input sources (1) and one or more output channel paths (4).

7. A tunable filter according to claim 6, in which the one or more input sources are selected from the group consisting of an active multi-wavelength laser or a semi-coherent device.

8. A tunable filter according to claim 6, including a collimating lens (7) so that the spatial positioning of the one or more input sources (1) is converted into an initial angular multiplexing through the filter.

9. A tunable filter according to claim 6, including a multi-way collimating lens array (8) for separately collimating each input source (1).

10. A tunable filter according to claim 1, in which the first dynamically variable wavelength dispersive element (3) comprises an array of N sub-holograms (9).

11. A tunable filter according to claim 1, in which the second static wavelength dispersive element (2) comprises an array of N fixes sub-holograms.

12. A tunable filter according to claim 1, including an output lens (5, 7) to convert the output angular direction of incident light beams into a spatial separation by wavelength.

13. A tunable filter according to claim 1, in which one or both of the first dynamically variable and second static wavelength dispersive elements (2,3) are reflective.

14. A tunable filter according to claim 13, in which the first dynamically variable wavelength dispersive element (3) comprises a back plane ferro-electric liquid crystal spatial light modulating device.

15. A tunable filter according to claim 13, wherein said tunable filter is configured so as to be folded about an optical axis so that the input (1) and output (4) lie in the same plane.

16. A tunable filter according to claim 1, further comprising a memory storing data for at least one computer generated hologram which when displayed in use, causes multiplexing of wavelengths in a predetermined manner.

17. A tunable laser including a tunable filter for polychromatic optical radiation within an optical cavity of said tunable laser, said tunable filter comprising an electronically programmable spatial light modulator for displaying computer generated hologram patterns of data as a series combination of a dynamically variable first wavelength dispersive element, and a second static wavelength dispersive element.

18. A tunable fiber ring laser including a tunable filter for polychromatic optical radiation, said tunable filter comprising an electronically programmable spatial light modulator for displaying computer generated hologram patterns of data as a series combination of a first dynamically variable wavelength dispersive element, and a second static wavelength dispersive element.

* * * * *